I. C. RUST.
HAY PRESS.
APPLICATION FILED JULY 21, 1914.
1,164,121.
Patented Dec. 14, 1915.
3 SHEETS—SHEET 1.
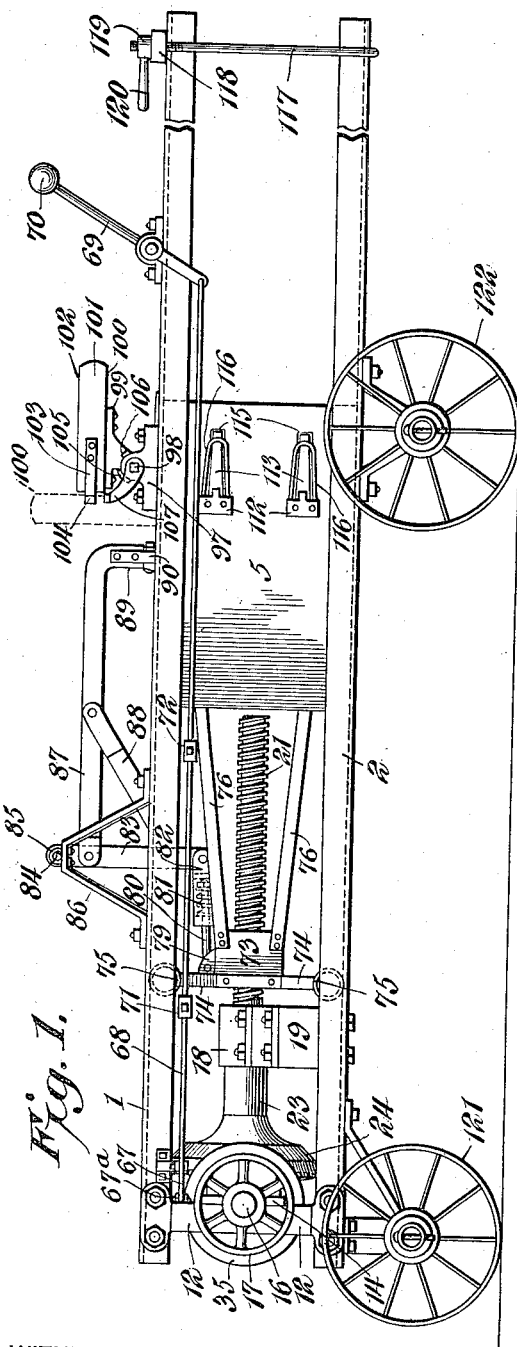
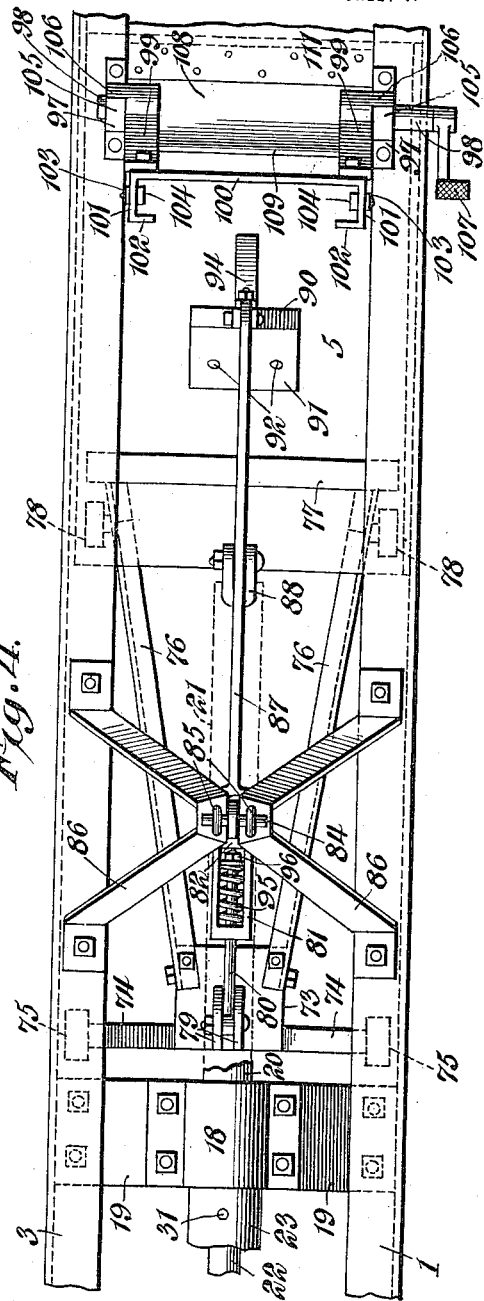
WITNESSES
Howard D. Orr
F. S. Chapman
Ira C. Rust, INVENTOR,
BY E. G. Siggers
ATTORNEY I. C. RUST.
HAY PRESS.
APPLICATION FILED JULY 21, 1914.
1,164,121.
Patented Dec. 14, 1915.
3 SHEETS—SHEET 2.
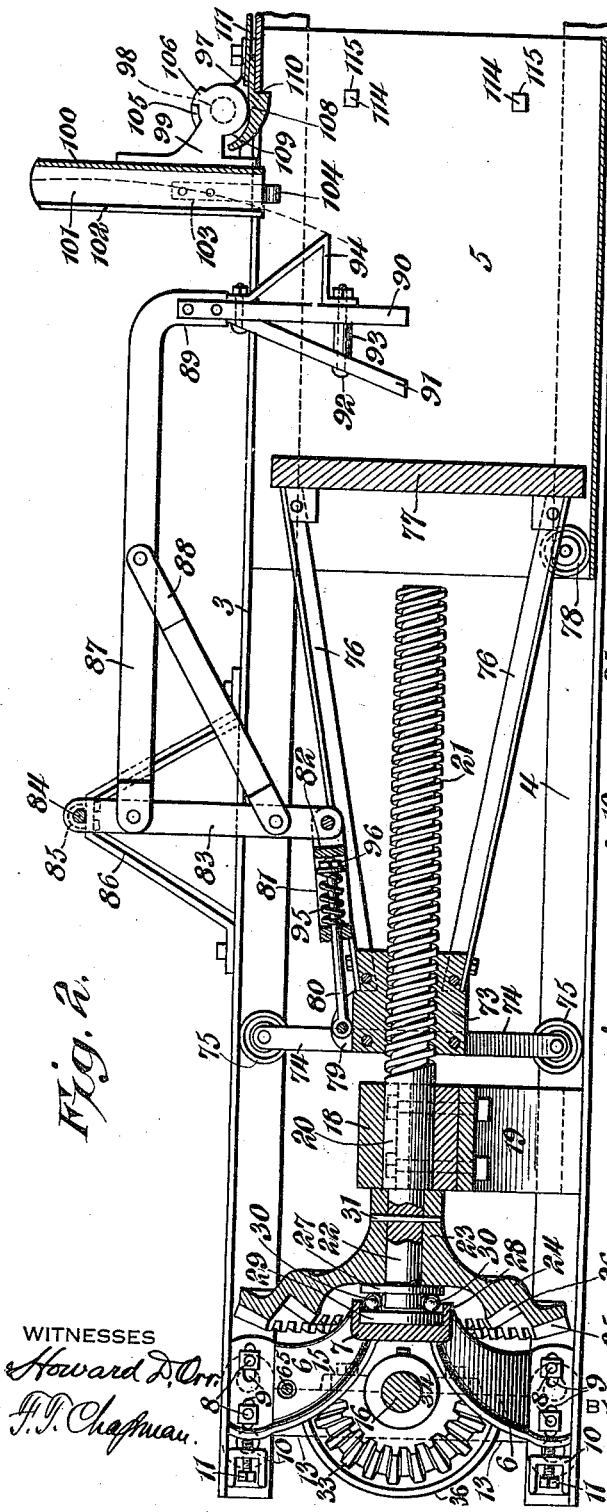
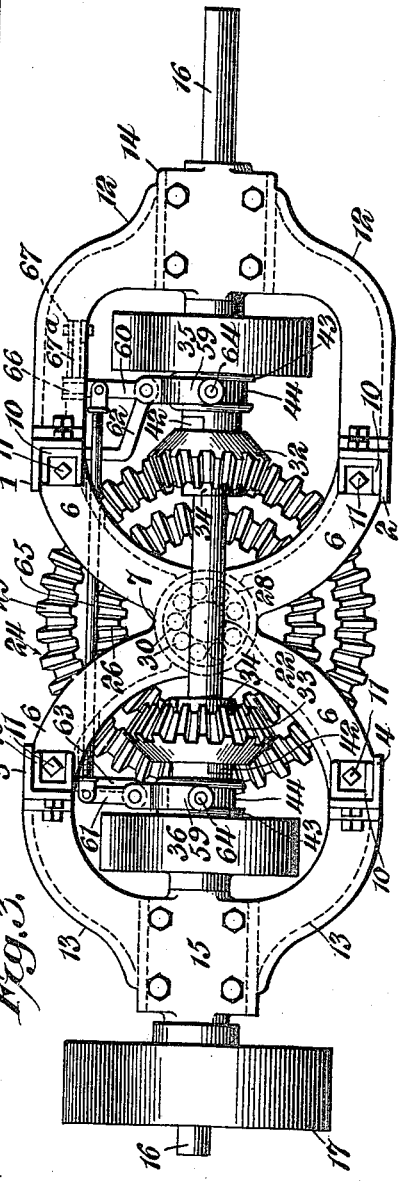
WITNESSES
Ira C. Rust, INVENTOR,
ATTORNEY

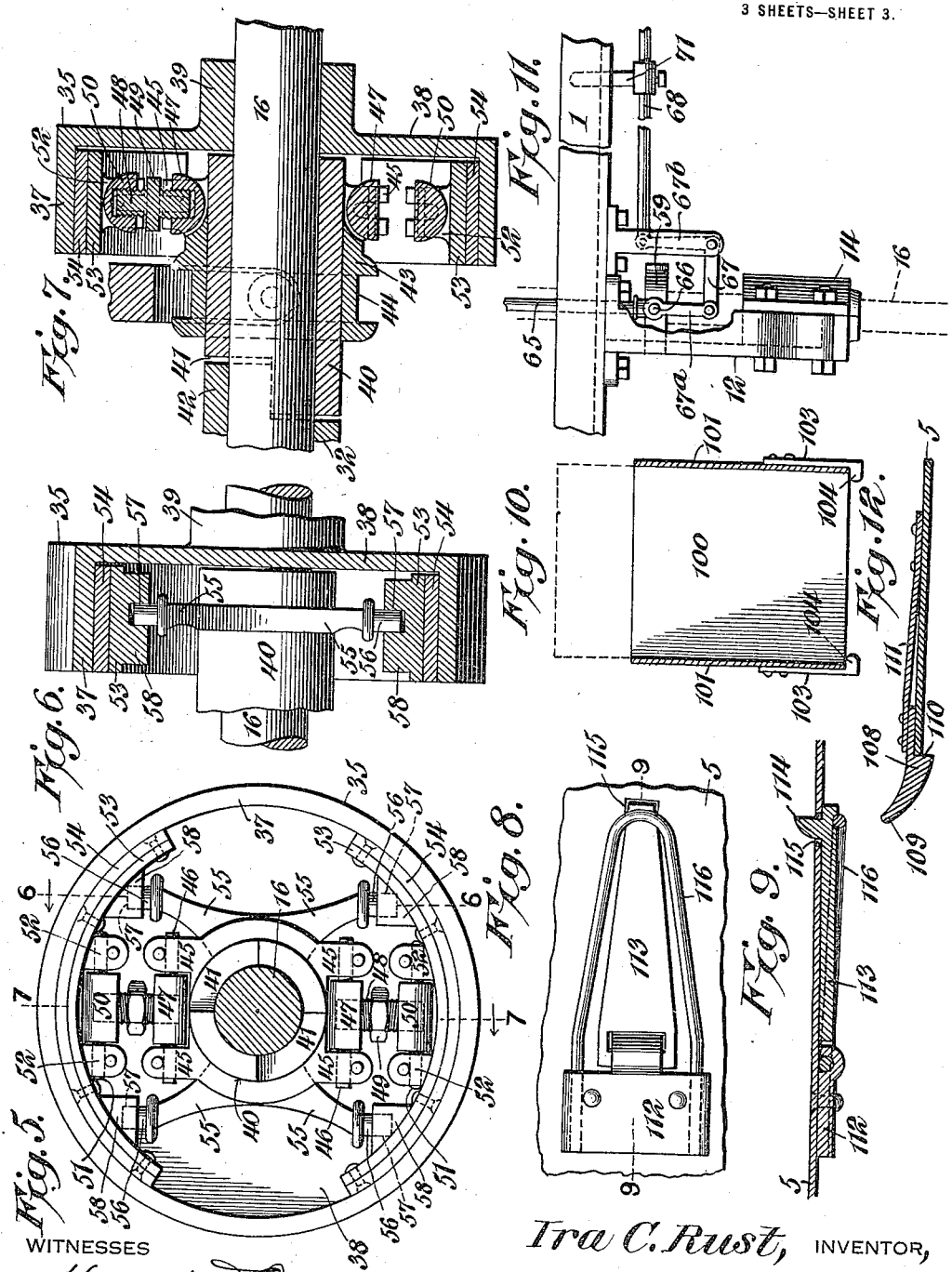

UNITED STATES PATENT OFFICE.

IRA C. RUST, OF FARMLAND, INDIANA.

HAY-PRESS.

1,164,121.     Specification of Letters Patent.     Patented Dec. 14, 1915.

Application filed July 21, 1914. Serial No. 852,266.

*To all whom it may concern:*

Be it known that I, IRA C. RUST, a citizen of the United States, residing at Farmland, in the county of Randolph and State of Indiana, have invented a new and useful Hay-Press, of which the following is a specification.

This invention has reference to improvement in hay presses, and is designed to produce a machine for the purpose containing a minimum amount of material in its construction to thereby reduce the cost of manufacture and weight without sacrifice of strength or durability and, furthermore, permitting the operation of the machine with materially less power than other machines for the purpose.

In accordance with the present invention the frame of the machine is made of angle steel, and may consist of four appropriately spaced L beams mounted directly upon suitable trucks with the spacing connections between the L beams forming material parts of the working structure and serving other purposes than that of bracing.

The press box or chamber is provided with a plunger or follower controlled by a guided nut in turn driven by a screw located in the longitudinal center line of the frame of the machine. This screw is mounted for rotative movements, but is held against longitudinal movement and has fast thereto at one end concentric gear wheels engaged by oppositely arranged pinions controlled by clutches for connecting one or the other of the pinions to a drive shaft, so that the compression stroke is performed at a speed permitting the application of great power, while the return or idle stroke may be at relatively great speed.

The invention also includes a packing structure connected to and operated by the follower feed nut in such manner as to give at a relatively long period of inactivity. Mounted on the baling chamber is a division board receptacle movable into and out of operative position, and when in operative position in the path of a member of the packer, so that the latter at proper intervals will cause the introduction of the division boards.

The invention also comprises other features which will appear from the detailed description to follow.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a side elevation of a baler constructed in accordance with the present invention. Fig. 2 is a vertical longitudinal section through the driving end and a portion of the baling chamber drawn on a larger scale than Fig. 1 and showing some parts in elevation. Fig. 3 is an elevation of the driving mechanism as viewed from the left hand end of Fig. 2. Fig. 4 is a plan view of the baling chamber section of the structure and some adjacent parts and drawn on a larger scale than Fig. 1. Fig. 5 is an elevation of one of the clutches with the shaft upon which it is mounted shown in cross-section. Fig. 6 is a section on the line 6—6 of Fig. 5 with some distant parts omitted. Fig. 7 is a section on the line 7—7 of Fig. 5, some parts being shown in elevation. Fig. 8 is an elevation of one of the latches and its spring employed on the baling chamber. Fig. 9 is a section on the line 9—9 of Fig. 8. Fig. 10 is a longitudinal section of the division board receptacle. Fig. 11 is a detail plan view of a portion of the clutch operating mechanism. Fig. 12 is a detail section of a guard for the baling chamber.

Referring to the drawings, there is shown a main or body frame made up of four beams 1, 2, 3, 4, the beams being of structural steel, and in the particular showing of the drawings, of angle or L form with the outermost webs upright and the other webs substantially horizontal and directed one toward the other. The beams are in substantial parallelism, and at about midway of their length carry a baling chamber 5, the walls of which are made of sheet steel of appropriate gage to withstand the internal pressure due to the baling operation, and also to connect and brace the beams 1, 2, 3 and 4 constituting the longitudinal corner or edge members of the main frame. Near what may be termed the front ends of the beams 1, 2, 3 and 4 they are connected to the extremities of arms 6 branching outwardly from a central portion or hub 7, which latter, together with the arms, constitutes a spider. The arms 6 are curved both outwardly and forwardly and are of web and flange construction for strength and lightness, and are expanded at the extremities in the direction of the length of the respective beams 1, 2, 3 and 4. The arms 6 are connected to the beams by bolts 8 extending through slots 9 in the webs of the arms, thus permitting lengthwise adjustment of the spider for a purpose which will hereinafter appear. The adjustment is facilitated by the employment of brackets 10 made fast to the respective longitudinal beams, and these brackets carry set screws 11 bearing against the flanges of the arms 6.

The spider made up of the arms 6 and hub 7 is interior to the main frame of the machine, while exterior thereto at the same end of the machine are other arms 12 and 13. The arms 12 expand from a journal bearing 14 and at their extremities are connected to the outer faces of the upright webs of the beams 1 and 2. The arms 13 expand from a journal bearing 15 and at their outer ends are connected to the upright webs of the main frame beams 3 and 4, respectively.

The journal bearings 14 and 15 are in alinement and carry a shaft 16 extending transversely of the corresponding end of the machine, intersecting the longitudinal center line of the main frame. The shaft 16 carries a main pulley 17 by means of which power is applied to the shaft through the intermediary of a belt, as is customary, but it will be understood that power may be applied to the shaft 16 in any suitable manner.

Between the interior spider joining the main longitudinal beams of the machine and the baling chamber, but quite close to the spider is a journal bearing 18 having its longitudinal axis in the longitudinal center line of the machine and in turn supported upon an arch 19 connected to and rising from the lower beams 2 and 4 of the main frame. Mounted in the journal bearing 18 is a shaft 20 extending longitudinally of the machine in the longitudinal center line thereof. On the side of the journal bearing 18 toward the baling chamber 5 the shaft 20 is screw threaded, as shown at 21, and in order to provide ample engaging surface without reducing the pitch of the threads to too great an extent, the threaded portion 21 is doubly threaded.

The shaft to the front of the bearing 18 is of reduced diameter, as shown at 22, and there receives the hub 23 of a gear wheel 24, this gear wheel being a bevel gear wheel with concentric series of gear teeth 25, 26, respectively, the outer gear teeth 25 being axially in advance of the inner gear teeth 26.

The reduced end 22 of the shaft 20 projects axially through and beyond the toothed face of the gear wheel, and there carries a collar 27 which may be of suitably hardened steel, while the hub 7 is formed on the face toward the gear wheel 24 with a cup 28 housing a wear plate 29, between which and the collar 27 there is lodged a series of anti-friction balls 30, designed to take up the thrust of the shaft 20, as will hereinafter appear. The hub 23 is connected to the shaft extension 22 by a pin 31, so that the gear wheel and shaft will rotate together, but this pin is purposely so proportioned that should an extraordinary load be put upon the machine the pin will shear before the load increases to destructive proportions.

Mounted on the shaft 16 are bevel gear pinions 32, 33, respectively, the pinion 32 being in mesh with the gear 25, and the pinion 33 being in mesh with the gear 26, and because of the greater axial extent of the gear 25 the pinion 32 is of less diameter than the pinion 33. The pinions 32 and 33 are normally loose upon the shaft 16, but are prevented from movement one toward the other along the shaft by set collars 34.

Mounted on the shaft 16 are clutches 35, 36, respectively, the clutch 35 controlling the pinion 32 and the clutch 36 controlling the pinion 33. The structure of these two clutches is substantially identical, and hence a description of one will apply to both, for which reason similar parts of the two clutches where appearing are designated by the same reference numerals. The description of the structure of the clutch will be apparent from Figs. 5, 6 and 7 in conjunction with Fig. 3. It will be considered that in Figs. 5, 6 and 7 the clutch 35 is shown. The clutch is provided with a circumferential flange 37 projecting from one face of a disk 38, and this disk is provided with a hub 39 fast on the shaft 16, the hub abutting against the journal bearing 14 or 15, as the case may be. On the shaft 16 and extending into the flanged portion of the rotatable member of the clutch is a sleeve 40 having at one end a recess 41 into which enters a tongue 42 formed on the corresponding portion of the pinion 32 or 33, as the case may be, so that any rotative movements of the sleeve 40 are participated in by the pinion 32.

Mounted on the sleeve 40 so as to move lengthwise thereof is a collar 43 provided near one end with a peripheral groove 44, and near the other end with spaced ears 45 receiving trunnions 46 on opposite ends of a block 47, there being two such pairs of spaced ears and two blocks 47 on diametrically opposite sides of the collar 43. Threaded into the block 47 is one end of a right and left hand screw 48 having a central portion 49 which may be of hexagonal or other suitable shape for the application of a tool. That end of the screw 48 remote from the block 47 is threaded into a similar block 50 having trunnions 51 journaled in spaced ears 52 formed on a curved plate 53 carrying a similar curved friction facing 54 adapted to engage the inner wall of the flange 37. Offstanding from opposite sides of the sleeve 40 are pairs of arms 55 terminating in pins 56 entering sockets 57 in bosses 58 formed on the respective plates 53, these arms serving to hold the plates, which together with the facings 54, constitute clutch shoes, within the flanges 37 against movement axially with relation to the clutch. If, now, the collar 43 be moved lengthwise of the sleeve 40, the blocks 47 and 50 being held in fixed relation one to the other by the screw 48 will rock on their journal pintles in the respective ears, thus causing the clutch shoes to approach and engage or recede and disengage from the inner walls of the flange 37, the movement of the clutch shoes toward and from the flange being guided by the pins 56.

To bring about the desired movements of the clutch shoes there are provided yokes 59, one for each clutch, and each yoke is formed on the corresponding end of a respective lever 60 or 61 pivotally supported in respective brackets 62 and 63 made fast to the beams 1 and 3, respectively. Each yoke 59 carries pins 64 entering the respective groove 44 so that on a rocking of the lever the collars 43 are moved along the sleeves 40. The arrangement is such that both collars move in the same direction at the same time, and as the clutches are oppositely arranged one clutch will go into action as the other clutch goes out of action. The arms of the levers 60 and 61 remote from the yokes are joined by a connecting rod or bar 65 which may be threaded at the ends for adjustment, or may be otherwise arranged for adjustment.

The lever 60 is provided with a continuation 66 connected by a link 67ª to one end of a bell crank lever 67 on a bracket 67ᵇ, the other end of this lever being connected to a reach rod 68 best shown in Fig. 1, and this reach rod is continued to a point adjacent to the baling chamber 5 where it is pivotally connected to one end of a manipulating lever 69 upstanding to a point where it may be within easy reach of an operator, and this lever is shown as provided with a ball or enlargement 70 tending to hold it by gravity in the active position. The reach rod 68 has adjustable stop blocks 71 and 72 thereon for a purpose to be described.

Mounted on the threaded portion 21 of the screw shaft 20 is a threaded block 73 from which extend arms 74 each carrying at its outer end a roller 75 positioned to travel along the respective beams 1, 2, 3 and 4 and serving to guide the block, thus taking any undue side thrust off of the screw shaft. Fast each at one end to the block 73 are angle bars 76 diverging from the block 73 and of a length to enter the baling chamber 5 where the corresponding ends of these bars are made fast to the corresponding corner portions of a follower 77, while rollers 78 carried by the lower bars 76 run on the bottom of the baling chamber, thus taking the weight of the follower from the screw shaft.

The block 73 is provided with ears 79 between which is pivoted one end of a rod 80, the other end of which enters an elongated frame 81. That end of the frame 81 remote from the end entered by the rod 80 has a head 82 to which is pivoted one end of a bar 83, and the other end of this bar is hung upon a pin 84 extending through ears 85 on the upper ends of respective standards 86 rising from the beams 1 and 3 and approaching as they rise, so that the bar 83 is midway of the width of the main frame. Fast to the bar 83 near its pivot support 84 is one end of another bar 87 connected at a point spaced from the bar 83 to a brace 88 in turn connected to the bar 83 near the frame 81. This arrangement provides a rigid frame movable about the pin 84 as a pivot, and the bar 87 is of a length to overhang the baling chamber at the free end of the bar where said bar has an angle continuation 89 to which fingers 90, 91 are secured, these fingers diverging and are held in spaced relation by a connecting bolt 92 carrying a spacing sleeve 93 between the fingers. Fast to the finger 90 and projecting toward the rear of the machine is a bracket 94 for a purpose to be described.

The rod 80 within the frame 81 is surrounded by a spring 95 one end of which engages that end of the frame 81 through which the rod 80 enters the frame and at the other end the spring abuts against an adjusting nut 96 on the rod. The end of the rod carrying the nut 96 normally engages the head 82 at the corresponding end of the frame 81.

The lever made up of the members 83 and 87 with the fingers 90 and 91 constitutes a packer for feeding hay into the baling chamber through the open upper end thereof in advance of the retracted follower. To the rear of the position assumed by the follower when active in the baling chamber, the top of the baling chamber carries appropriate journal blocks 97, in which trunnions 98 are journaled. Adjacent to the journal blocks the trunnions carry brackets 99 in turn carrying a plate 100 having end portions 101 in forward angular relation to the plate, while the edges of these end portions remote from the plate are returned one toward the other as shown at 102, thus forming an open ended receptacle into which division boards may be placed. One end of the receptacle carries spring fingers 103 each terminating in a latch member 104 of sufficient size to engage and retain a division board, but readily yieldable to a force somewhat greater than the weight of the board, so that the board may be easily ejected from the receptacle. Coacting stops 105 and 106 on the journal blocks 97 and brackets 99, respectively, engage when the receptacle is moved to an upright position, thus preventing the receptacle from overriding such position. A treadle 107 on one trunnion 98 forms a conveying means for moving the receptacle from a normally horizontal position to an upright position, these two positions being best shown in Figs. 1 and 2.

Extending across the hay receiving opening on top of the baling chamber is a plate 108 having an upturned nose portion 109 and recessed along the other edge as shown at 110. The plate is carried by a spring 111 which may be of the leaf spring type and of suitable length to yield as desired, the spring being connected at one end to the plate 108 and at the other end to the top of the baling chamber. The plate 108 serves as a guard for hay being pressed into the baling chamber preventing it from catching on the mouth of the baling chamber and yieldable to a mass of hay being compressed, the recessed portion 110 permitting the plate to enter into the baling chamber for a short distance. On the sides of the baling chamber clips 112 are applied, and each clip serves as a pivot support for a latch finger 113 extending rearwardly of the baling chamber and provided with a nose portion 114 entering the baling chamber through an appropriate passage 115. A U spring 116 engages the free end of the latch by the yoke portion of the spring, while the legs of the spring are held by the clip 112 to the baling chamber, the clip being suitably recessed for the purpose. The latches serve to prevent return of the compressed hay on the retraction of the plunger.

At the discharge end of the press the frame members 1, 2, 3 and 4 are engaged by a U-shaped yoke member 117 with the legs traversing a bar 118 and suitably threaded for the application of nuts 119, each of which may be provided with a handle 120, so that the corner beams of the frame may be caused to approach to reduce the effective size of the discharge end, and thus regulate the amount of pressure applied in baling. The frame is supported upon front wheels 121 and rear wheels 122, so that the baler may be transported from place to place as is customary.

In the structure described it is unnecessary to make any part shown of any other material than steel, some of the structures being of structural steel, and others of cast or forged steel, and still others of sheet steel, and only a small amount of machining is necessary. The arrangement is such that the structure is particularly durable, may be made at a comparatively low cost, and is capable of compacting hay to the minimum thickness of bale without danger of injury to any parts.

The baler may be controlled as desired to operate at will, or it may be readily released to automatic action. Let it be assumed that in the position of the parts shown in Fig. 1 a suitable quantity of hay has been introduced into the baling chamber by the self feeder, and that power is being applied to the main drive shaft 16. In the position shown the lever 69 has been moved to bring the clutch 35 into action, thus causing the pinion 32 to rotate and drive the screw shaft 20 in the proper direction to feed the nut 73 along it, so as to force the follower 77 into the baling chamber. As this movement starts the rod 80 engaging the frame end 82 causes the feeder lever to rock on the pivot 84 to carry the fingers 90 and 91 out of the baling chamber, the receptacle 100 having in the meantime been rocked by the operator to the horizontal position and at an appropriate time a division board is placed therein. As the nut block 73 is fed to the rear by the screw shaft the self feeder is raised to a high position well out of the way and remains in such high position for the greater portion of the travel of the follower. Ultimately one of the arms 74 or any other traveling part of the structure is brought into engagement with the stop block 72, causing the rod 68 to then travel lengthwise of the machine with the follower and parts traveling with it until the lever 69 is rocked on its pivot away from its position toward the reverse position, this causing the opening of the clutch 35 and the closing of the clutch 36. Now, because the pinion 33 is relatively large and the gear 26 is relatively small, the screw shaft is rotated at a relatively high speed in a direction to retract the plunger, so that the retracting movement is much more quickly performed than the pressing movement. As the block 73 approaches the retracted position the feeding fingers 90 and 91 are ultimately moved into the baling chamber into which loose hay has been inserted, and the hay is forced into the baling chamber ready for the next forward movement of the plunger, any resistance offered by the introduced hay being taken up by the spring 95. After the hay has been introduced, and before the feeder moves into the baling chamber the receptacle 100 is moved to the upright position, so that as the self feeder moves into the baling chamber a division board is forced therefrom into the baling chamber ready to receive the impact of the hay being compressed. When the block 73 has nearly reached the retracted position the stop block 71 is engaged, thus rocking the lever 69 to its first position and causing disengagement of the clutch 36 and reëngagement with the clutch 35, so that the pressing action of the plunger begins and proceeds with great power because of its slower movement and greater difference in ratio between the pinion 32 and gear 25 then occurs between the pinion 33 and gear 26. The operations as described continue indefinitely and each charge of hay with its division board passes out of the baling chamber into the contracted end of the press, where the usual binding parts may be present to provide for the completion of the bales. If, however, the operator wishes to control the action of the press at will, then instead of permitting its automatic continuance, the operator moves the lever 69 by hand to a position throwing out both clutches, whereupon the feed screw stops. It may be started again in either direction in accordance with the position to which the operator then moves the said lever. By the provision of the adjustable end thrust bearings for the screw shaft much power is conserved for the mesh of the gear teeth may be adjusted with a nicety and at the same time friction due to the thrust is reduced to a minimum by the anti-friction bearings at this point.

What is claimed is:—

1. In a baling press, a baling chamber, a plunger therein, a rotatable operating screw located in a prolongation of the longitudinal center line of the baling press and provided with means for holding it against longitudinal movement, a nut on the screw movable therealong, connections from the nut to the plunger for causing participation of the latter in the progressive movements of the nut along the screw, and means concentric with the longitudinal central axis of the screw for rotating the latter at a relatively slow speed in the compressing direction and at a relatively rapid rate in the opposite direction.

2. In a baling press, a baling chamber, a plunger therein, a rotatable operating screw located in a prolongation of the longitudinal center line of the baling chamber, said screw being fixed against longitudinal movement, a nut on the screw, connections between the nut and the plunger for causing participation of the plunger in movements of the nut along the screw, and means for operating the screw comprising concentric gears displaced axially of the screw, pinions of different diameters engaging the gears, and clutches individual to the pinions.

3. In a baling press, a baling chamber, a plunger therein, a rotatable operating screw located in a prolongation of the longitudinal center line of the baling chamber, said screw being fixed against longitudinal movement, a nut on the screw, connections between the nut and the plunger for causing participation of the plunger in movements of the nut along the screw, and means for operating the screw comprising concentric gears displaced axially of the screw, pinions of different diameters engaging the gears, and clutches individual to the pinions, said clutches having connections and operating means for causing alternate active movements of the clutches.

4. In a baling press, an elongated and substantially rectangular frame provided with corner beams, a baling chamber carried by the frame intermediate of the length of the latter, a plunger in the baling chamber, a rotatable operating screw located in a prolongation of the longitudinal center line of the baling chamber, a nut on and movable along the screw, connections from the nut to the plunger for actuating the latter, and a spider connecting and bracing all four corner beams of the frame near one end of the latter and provided with a thrust bearing for the screw in the longitudinal center line of the frame.

5. In a baling press, a frame, a baling chamber carried by the frame, a plunger in the baling chamber, a rotatable operating screw located in a prolongation of the longitudinal center line of the baling chamber, a nut on and movable along the screw, connections from the nut to the plunger for causing participation of the plunger in movements of the nut, and a thrust bearing for the screw having connections with the frame and forming a connecting member therefor, said screw being provided with concentric gears displaced axially of the screw, pinions of different diameters engaging the gears, and clutches for controlling the pinions, said thrust bearing being adjustable in the direction of the length of the longitudinal center line of the machine for determining the degree of mesh of the pinions and gears.

6. In a baling press, a main frame of substantially rectangular cross-section composed of longitudinally disposed corner angle beams, driving mechanism, journal supports for the driving mechanism connected to and connecting the longitudinal angle beams at one end of the frame, a baling chamber supported by and constituting the sole connecting means for the angle beams at an intermediate portion of the frame, baling mechanism connected to the driving mechanism for operation thereby, and a spider at the same end of the frame having the journal supports, said spider being connected to the corner beams for spacing and bracing the latter and in the longitudinal center line of the frame having a thrust bearing for the baling mechanism.

7. In a baling press, a frame structure of substantially rectangular cross-section comprising longitudinally disposed corner beams spaced about the longitudinal center line of the frame, a baling chamber carried by the frame, a plunger for the baling chamber, actuating means for the plunger, and a spider at one end of the frame connected to and adjustable along the corner beams lengthwise thereof, said spider being provided with a thrust bearing for the actuating means participating in movements of adjustment of the spider lengthwise of the frame.

8. A baling press provided with a frame structure composed of longitudinally disposed corner beams spaced about the longitudinal center line of the frame, baling mechanism carried by the frame, and a thrust bearing for the baling mechanism comprising a spider having a central portion for receiving the thrust of the baling mechanism and divergent arms connected to the beams, said arms extending away from the portion of the baling mechanism engaging the thrust bearing as the arms approach the point of connection with the corner beams.

9. A baling press provided with a main frame composed of longitudinally disposed angle beams, a baling chamber located intermediate of the length of the beams and connected to and there spacing the beams, bearing members at one end of the frame and connected to and forming the spacing means for the angle beams, driving means carried by the bearing means, a plunger in the baling chamber, and operating means therefor connected to the plunger and in coöperative relation to the bearing means for support thereby, said operating means for the plunger comprising a rotatable screw fixed against longitudinal movement and provided with concentric axially displaced gears with a nut on the screw connected to the plunger, and said screw engaging the bearing means for holding it against longitudinal movement, and a driving mechanism including pinions engaging the gears.

10. A baling press provided with a main frame composed of longitudinally disposed angle beams, a baling chamber located intermediate of the length of the beams and connected to and there spacing the beams, bearing members at one end of the frame and connected to and forming the spacing means for the angle beams, driving means carried by the bearing means, a plunger in the baling chamber, and operating means therefor connected to the plunger and in coöperative relation to the bearing means for support thereby, said operating means for the plunger comprising a rotatable screw fixed against longitudinal movement and provided with concentric axially displaced gears with a nut on the screw connected to the plunger and said screw engaging the bearing means for holding it against longitudinal movement, and a driving mechanism including pinions engaging the gears, the bearing means for holding the screw against longitudinal movement being adjustable in the direction of thrust of the screw to determine the degree of mesh of the pinion and gears.

11. In a baling press, a main frame comprising longitudinal angle beams, a baling chamber carried thereby, a plunger in the baling chamber, a rotatable screw, means for supporting the screw and holding it against longitudinal movement, a nut on the screw provided with roller supports engaging the angle beams to travel therealong, and connections between the nut and the plunger for causing participation of the latter in movements of the nut along the same.

12. In a baling press, a baling chamber, a plunger, a rotatable feed screw for the plunger held against longitudinal movement, a nut carried by the feed screw and connected to the plunger, a rockable self feeder for the baling chamber, and connections between the rockable self feeder and the nut.

13. In a baling press, a baling chamber, a plunger, a rotatable feed screw for the plunger held against longitudinal movement, a nut carried by the feed screw and connected to the plunger, a rockable self feeder for the baling chamber, and connections between the rockable self feeder and the nut, the self feeder being in the form of an angle lever having a pivot support above the main frame, and the connections between the self feeder and the nut being in the form of a link.

14. In a baling press, a baling chamber, a plunger, a rotatable feed screw for the plunger held against longitudinal movement, a nut carried by the feed screw and connected to the plunger, a rockable self feeder for the baling chamber, and connections between the rockable self feeder and the nut, the self feeder being in the form of an angle lever having a pivot support above the main frame and the connections between the self feeder and the nut being in the form of a link, and said link having its continuity broken and there elastically connected to yield to resistance in the path of the feeder due to compacting material into the baling chamber of the press.

15. In a baling press, a baling chamber and plunger therein, oppositely acting means for operating the plunger, means for alternately connecting up and disconnecting the oppositely acting means for operation, a reciprocable rod for controlling the operating means, stop means on the rod for causing its movement by the operating means, and means for causing movement of the rod to an extent additional to that caused by the operating means.

16. In a baling press, a baling chamber, and a plunger, means for reciprocating the plunger including a reciprocable member, means for connecting up the reciprocable member for opposite operation thereof, a reach rod connected to the coupling means for the operation thereof, and provided with stop means in the path of the rockable member, and a dead center gravity member connected to the reach rod for closing movements of the latter in addition to the movements caused by the reciprocable member.

17. In a baling press, a baling chamber and plunger therein, a nut connected to the plunger for causing movements thereof, a rotatable screw for moving the nut and held against longitudinal movement, gearing for rotating the screw in opposite directions, clutches for coupling up the gearing to cause the opposite movements of the screw, a reach rod connected to the clutches for their operation and provided with stop members in the path of movement of the nut, and a dead center gravity member connected to the reach rod for causing movements of the latter to a greater extent than caused by the engagement of the nut with the stop members.

In testimony, that I claim the foregoing as my own, I have hereto affixed my signature in the presence of two witnesses.

IRA C. RUST.

Witnesses:
C. E. WILLIAMS,
CLIFF G. BALES.

Copies of this patent may be obtained for five cents each, by addressing the "Commissioner of Patents, Washington, D. C."